(12) United States Patent
Zhang et al.

(10) Patent No.: US 8,718,329 B2
(45) Date of Patent: May 6, 2014

(54) TOP-DOWN VIEW CLASSIFICATION IN CLEAR PATH DETECTION

(75) Inventors: Wende Zhang, Troy, MI (US); Jinsong Wang, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 221 days.

(21) Appl. No.: 13/441,979

(22) Filed: Apr. 9, 2012

(65) Prior Publication Data

US 2013/0266186 A1   Oct. 10, 2013

(51) Int. Cl.
*G06K 9/00* (2006.01)
*G08G 1/00* (2006.01)
*G08G 1/123* (2006.01)

(52) U.S. Cl.
USPC ............................. 382/104; 340/901; 340/988

(58) Field of Classification Search
USPC .......... 382/103, 104, 236; 348/118, 148, 169, 348/837; 340/426.23, 901, 976, 988, 340/995.17, 995.25; 701/301, 527
See application file for complete search history.

(56) References Cited

U.S. PATENT DOCUMENTS 7,676,062 B2 *   3/2010   Breed et al. .................... 382/100
8,395,529 B2 *   3/2013   Seder et al. .................... 340/905

* cited by examiner

*Primary Examiner* — Abolfazl Tabatabai

(57) ABSTRACT

A method of detecting a clear path in a road of travel for a vehicle utilizing a top-down view classification technique. An input image of a scene exterior of the vehicle is captured. The captured input image represents a perspective view of the road of travel. The captured input image is analyzed. A segmented top-down image that includes potential clear path regions and potential non-clear path regions are generated. The segmented top-down image represents a viewing angle perpendicular to a ground plane. The segmented regions of the segmented top-down view are input to a classifier for identifying the clear path regions of travel. The identified clear path regions are utilized for navigating the road of travel.

19 Claims, 3 Drawing Sheets

TOP-DOWN VIEW CLASSIFICATION IN CLEAR PATH DETECTION

BACKGROUND OF INVENTION

An embodiment relates generally to object detection in a path of travel of a vehicle.

Vision-imaging systems are used in vehicles for enhancing applications within the vehicle such as autonomous driving system or semi-autonomous driving systems. Such systems may be used to autonomously or semi-autonomously control the vehicle through steering systems, throttle control, braking control, or even utilized for lane departure warning systems.

Clear path detection systems identify a clear path in which to operate a vehicle traveling along a road. The path of travel is sensed for objects, including all non-road surfaces, so that the vehicle may travel along an uninterrupted path of travel. Features within an image may be detected and analyzed according to their form and relationship to the roadway. However, such methods may be slow due to intense data processing or the inability to distinguish clear path features and non-clear path features.

SUMMARY OF INVENTION

An embodiment contemplates a method of detecting a clear path in a road of travel for a vehicle utilizing a top-down view classification technique. An input image of a scene exterior of the vehicle is captured. The captured input image represents a perspective view of the road of travel. The captured input image is analyzed. A segmented top-down image that includes potential clear path regions and potential non-clear path regions is generated. The segmented top-down image represents a viewing angle perpendicular to a ground plane. The segmented regions of the segmented top-down view are input to a classifier for identifying the clear path regions of travel. The identified clear path regions are utilized for navigating the road of travel.

DETAILED DESCRIPTION

Figure 1:
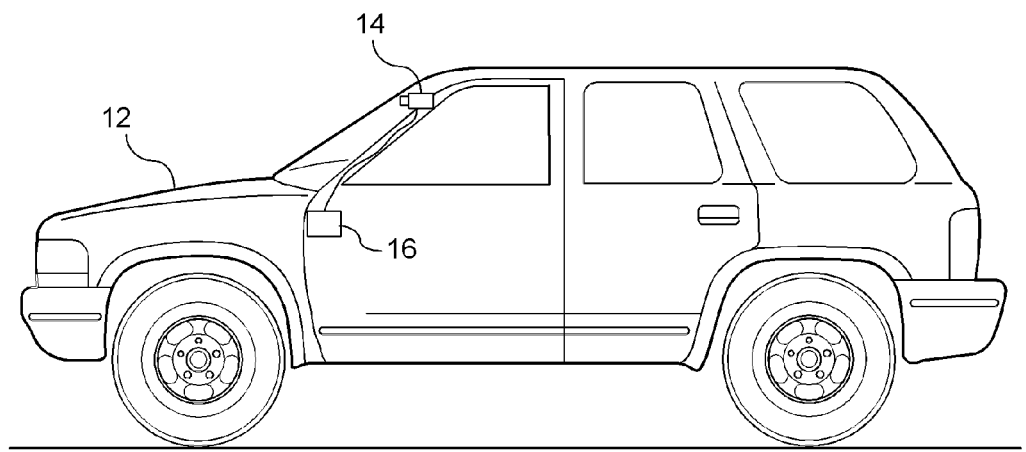
FIG. 1 is a perspective view of a vehicle integrating a clear path detection system.

There is shown in FIG. 1 a block diagram of a clear path detection system. The clear path detection system includes an image capture device 14 mounted to a vehicle 12. The image capture device 14 is in communication with a processing unit 16.

The image capture device 14 may include a camera or other imaging device that captures images of the road of travel. The image capture device 14 captures images forward of the vehicle that are used to identify a clear path of travel. Preferably, the image capture device 14 is configured for performing continuous image capture. The images captured by the image capture device 14 may be stored in a memory of the image capture device 14, transferred to an off-board memory device, or may be transferred to the processing unit 16 for analysis. Moreover, more than one capture image device may be used in order to capture images rearward and/or on both sides of the vehicle for clear path detection. With a surrounding view system, four wide field-of-view (180 degree+) cameras and a forward looking narrow field-of-view (~50 degrees) camera perform clear path detection. Images captured rearward of the vehicle may be used in the analysis for identifying the clear path of the road of travel forward of the vehicle.

The captured images are preferably a two-dimensional image of known pixel dimensions. The image contains a plurality of identifiable pixels (color or grayscale). Each of the pixels includes a set of bits that correspond to a color on a predetermined color map that represents a color intensity value.

The processing unit 16 as illustrated in FIG. 1 is a single unit; however, it should be understood that functions of the processing unit 16 may be performed by one or more devices implemented in software, hardware, and/or application-specific integrated circuitry. The processing unit 16, may be a general purpose processor, digital computer including a central microprocessor or central processing unit, ASIC, or other processing module having non-volatile memory, read only memory, programmable read only memory, RAM, A-to-D circuitry, D-to-A circuitry, input/output circuitry, buffering capability and appropriate signal conditioning such as digital signal processing. The processing unit 16 is devised to execute algorithms utilizing inputs from the devices described herein as well as other devices or systems within the vehicle.

The processing unit 16 determines a clear path in the captured image and the clear path is utilized in guiding the vehicle along the road of travel. The processing unit 16 may perform the guidance functions as described above or may transfer the results to a secondary application that performs the guidance functions.

Figure 2:
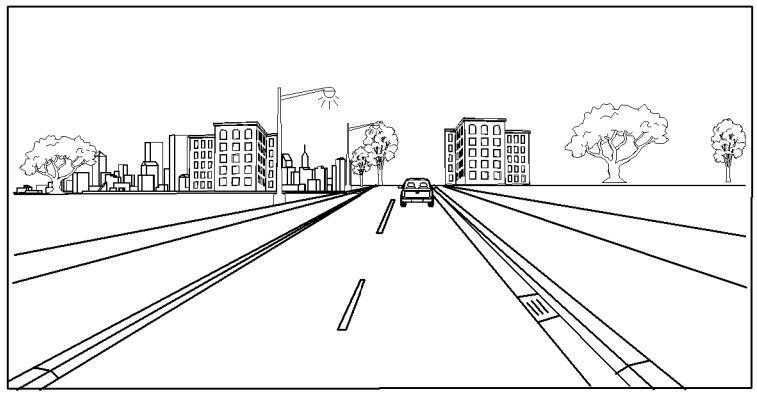
FIG. 2 is an exemplary perspective view of a captured input image from an image capture device.

The following is a description of a segmentation and classification technique used for determining the clear path of travel. In FIG. 2, an exemplary image of the path of travel is captured exterior of the vehicle by the image capture device. The image is a perspective view of the road of travel as captured by the image capture device. The image is analyzed for segmenting the image. Segmentation subdivides the image according to discernable boundaries within the image so that each segment may be analyzed for determining whether a respective segment is part of the clear path of travel. Segmentation as used herein is used as a framework for pre-processing the image which is used to later identify the clear path of travel. Segments are first identified that are discernable from one another. Pre-processing assumptions may be made by the segmentation as to what each segment represents. The results may then be applied to a classifier, which will be discussed in detail later, for making a final determination as to whether each identified segment is part of the clear path of travel.

Figure 3:
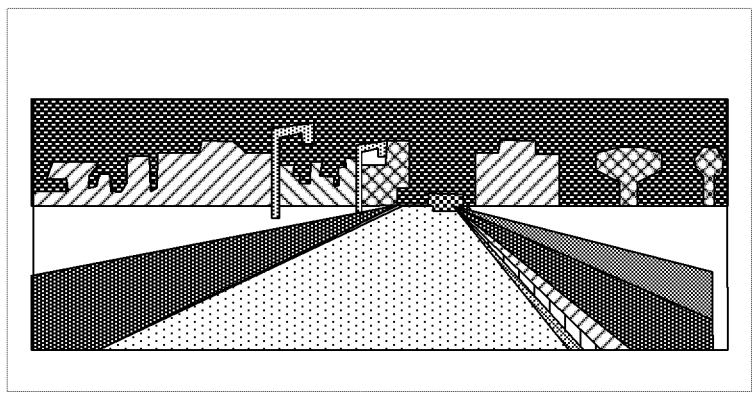
FIG. 3 is an exemplary segmented image of the captured input image.

FIG. 3 represents a segmented image of the captured input image. Segmentation technique applied is described in co-pending application Ser. No. 12/581,742 filed Oct. 19, 2009, which is incorporated by reference in its entirety. The segmentation technique analyzes the image using several analysis methods in parallel. In contrast to techniques that filter away portions of the image, the exemplary segmentation-based method seeks to subdivide or segment the image according to discernable boundaries within the image.

Figure 4:
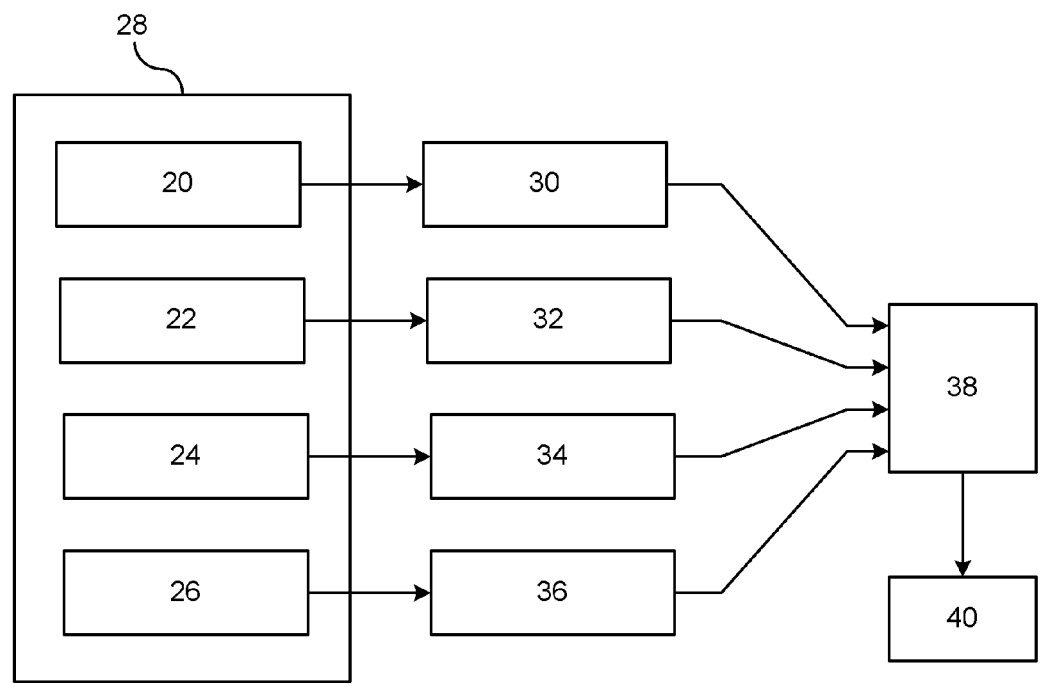
FIG. 4 is a block diagram of segmentation techniques used to subdivide an image.

The segmentation technique uses analysis methods to subdivide an image. Various techniques are collectively used to identify a plurality of segments within the image. Exemplary analysis techniques are depicted in steps 20 through 26 of FIG. 4. The techniques of steps 20 though 26 can be collectively described as analysis techniques employed in the segmentation method 28. Steps 20 through 26 make judgments to subdivide the image based upon the analysis methods set forth in steps 30 through 36. The results output from these respective steps are fused for identifying potential clear paths in the captured image. The exemplary analysis techniques include motion analysis 20, texture analysis 22, color analysis 24, and geometry analysis 26.

Motion analysis 20 can be executed in many different ways. For example, differencing between two images or a series of images can be utilized to distinguish movement of an object with respect to a background. In another example, feature recognition within the image can be utilized to evaluate a visible object to conform with a shape known to be prone to movement, such as another vehicle oriented in a particular direction to the vehicle, or a pedestrian. In yet another example, a secondary vehicle system, such as a radar system, can be utilized in addition to the image capturing, which provides radar reflection data from the object. Another example of a secondary vehicle system may include a vehicle to vehicle (V2V) communications, vehicle to infrastructure (V2I), or V2X system which provides position and movement data from the communicating vehicle or entity, so that tracking and movement of the object can be discerned and overlaid with the image to impose a subdivision upon the image. An example of this would include opposing traffic upon a two-way street. Sensing the movement of that traffic can be used to segment the opposing lane from a current lane. Other forms of motion analysis are known in the art and it will be appreciated that motion of the vehicle can be taken into account when judging motion of objects within the image.

Once motion analysis 20 is performed, objects or regions of the image associated with the motion relative to a stationary ground plane can be segmented or subdivided from the rest of the image as a region of the image not likely to be a candidate for a clear path. In block 30, a portion of the image is segmented as a stationary area potentially containing a clear path from the region with identified motion. A number of methods to employ information discernable through motion analysis are envisioned, and the disclosure is not intended to be limited to the particular embodiments described herein.

Texture analysis 22 is described in association with the texture rich and textureless methods. According to exemplary texture rich methods, pixel intensity contrasts, color contrasts, recognizable lines, corners and other features can all be recognized and analyzed in an image. According to exemplary textureless methods, different filters can be applied to the image based upon recognizable patterns in the image to identify areas in the image more likely to include a clear path.

Once texture analysis is performed in block 22, analysis of apparent features and/or textureless regions of the image can provide definition of portions of the image useful to segment the image. In block 32, portions of the image are segmented based upon properties detected and potential impacts to potential clear paths. Presence of particular textures or pixelated features can be useful for analysis. For example, lane markers can be discerned and are useful to define different segments or sub-divisions of the image to represent the road surface and relevant to defining a clear path. Similarly, curbsides, road shoulders, and roadside barriers can be used to segment a portion of the image representing the road surface from other areas of the image. Similarly, as described above, lane geometry or other indications that can be determined through texture analysis can be useful to define a horizon or vanishing point. The horizon or vanishing point can also be used to segment the ground upon which a clear path may exist from sky and other background above the horizon upon which a clear path may not exist. Additionally, objects discernable through texture rich analysis can be analyzed according to their height relative to the surface of the ground. Through this analysis, texture describing a median of the road, a snow bank, or a line of parked cars can be used to segment a region of the image upon which a clear path cannot exist from a region upon which a clear path can exist. Furthermore, a lack of texture or identification of a textureless region of the image, as a flat surface of a roadway may appear, can be useful to identify a segmented portion of the image as a potential clear path from other areas with discernable texture. A number of methods to employ information discernable through texture analysis are envisioned, and the disclosure is not intended to be limited to the particular embodiments described herein.

Color analysis 24 can be employed, in methodology similar to the textureless methods described above, to segment a portion of the image that can represent a road surface upon which a clear path may exist from areas that cannot represent a road surface. Whereas the textureless method filters or eliminates portions of an image based upon texture, color analysis 24 segments portions of the image based upon color, specifically segmenting portions of the image with colors that can represent a road surface from portions of the image with colors that cannot represent a road surface.

Once color analysis 24 is performed, regions of the image with colors that can represent a road surface can be distinguished from areas of the image that cannot represent a road surface in block 34. Color analysis 24 can segment portions of the image by color, such as segmenting a green area of the image from a gray area of the image. In this example, a road can be gray, whereas a road is unlikely to be green. Color analysis 24 can similarly be used to define lane markers, construction zone markers, school zone markers, hatched designs upon the road indicating do not travel zones and other indications that can be judged according to color of markings upon or near the road. A number of methods to employ information discernable through color analysis are envisioned, and the disclosure is not intended to be limited to the particular embodiments described herein.

Geometric shapes analysis 26 can be utilized to identify regions of the image likely to indicate a road surface capable of being a clear path. Such geometric patterns can, once identified, be analyzed for significance to existence of a clear path in block 36. For instance, a parallelogram-based shape that is wider at the base and narrower at the top, with substantially parallel lines including the base of the image and a determined horizon line can be indicative of a current lane of travel upon a roadway. Regions bounded by lines seemingly parallel to a current lane of travel can be indicative of a neighboring lane of travel and potentially a clear path depending upon other indications. Shapes contiguous with a current lane of travel or an identified neighboring lane of travel, not segmented from the respective lane of travel, can potentially be a connecting roadway and potential clear path. In addition, shapes can be logically joined together to indicate a road surface or lane of travel. For example, a transition from a roadway to a bridge surface frequently includes a noticeable transition. Such a transition, identified through the methods described above, can create geometric shapes terminating at the transition. However, analysis of the geometric shapes can indicate that the two shapes together likely indicate a contiguous lane of travel.

Similarly, geometric shapes can be identified as not being indicative of a roadway or a lane of travel capable of being a clear path. Lanes of travel require that a vehicle can travel through the lane. Shapes ending abruptly and separated by a shape indicating an abrupt change in the boundary of a shape representing a surface or otherwise indicating obstruction to travel can be used to segment portions of an image from other areas that can be a clear path. Exemplary shapes indicating abrupt changes in the boundary of a shape representing a surface can include shapes exhibiting vertical lines consistent with walls or sharp curbs.

Additionally, a size of an identified geometric shape can be descriptive of whether the shape can represent a roadway or clear path. A lane of travel close to the vehicle must be at least a certain size in order to be a clear path through which the vehicle can travel. A geometric shape or a pattern of geometric shapes can be determined to support or not support a clear path due to the potential size of the road surface indicated by the shapes. As the analyzed surface is further away from the vehicle, a lane of travel supporting a clear path can appear smaller in the image due to perspective. A number of methods to employ information discernable through shape analysis are envisioned, and the disclosure is not intended to be limited to the particular embodiments described herein.

It will be appreciated that the methods described above are exemplary for segmenting different portions of the image that may distinguish a clear path from a non-clear path. Various techniques affect the accuracy or efficiency in identifying the clear path such techniques may be selectively and collectively utilized in segmenting the image.

Other types of segmentation techniques may include but are not limited to, histogram thresholding segmentation, auto-thresholding segmentation, ostu-segmentation, region growing segmentation, watershed segmentation, clustering segmentation, graph-based segmentation, and radar, LIDAR, global positioning data in combination with a digital map, vehicle to vehicle communication, vehicle to infrastructure communication, or other inputs describing an operating environment of the vehicle can be used to provide distinct analysis that can be overlaid upon and used to segment the input image. Other methods of image processing or analysis or other sources of information regarding the operating environment of the vehicle can be employed in addition or in the alternative to those given as examples.

In block 38, once analysis of the image through the exemplary segmentation techniques described above is complete, the various analyses can be fused into a single description of the features within the image illustrating segmented portions of the captured image. As described herein, FIG. 3 depicts feature segmentation utilizing the various techniques described above. As shown in FIG. 3, various portions of the road are segmented for identifying distinctions between the different features of the image. Segmented portions can be analyzed for determining whether a respective segmented portion is part of a clear path or non-clear path.

Each segmented portion can be input to a classifier 40 for analyzing each respective segment and determining whether the respective segment is part of the clear path. A classifier such as a support vector machine, or other type of classifiers, can be used for classifying the respective segment as part of the clear path or non-clear path.

Support vector machines (SVMs) include a set of related learning algorithms used for classification and regression. The learning algorithms are training methods that build models used to predict whether a new sample falls into one category or another category (e.g., clear path and non-clear path). The SVM model is a representation of categories of points in feature space and mapped so that the separate categories are divided by a clear gap. The support vector machine maps input data to a higher dimensional space where a maximal separating hyperplane is constructed. The support vector machine constructs two parallel hyperplanes. The two parallel hyperplanes are constructed on each side of the separating hyperplane for separating the data. The separating hyperplane maximizes the distance between the two parallel hyperplanes. A good separation is desired between the parallel hyperplanes that have the largest spatial distance to the nearest training datapoints of any class. The basic concept is that the larger the distance between the two parallel hyperplanes, the lower the misclassification rate will be when classifying the data to a respective class.

Other classifiers including, but not limited to, AdaBoost may be used for identifying whether a segmented portion is part of the clear path of the road of travel. AdaBoost is a machine learning algorithm, used in cooperation with various other learning algorithms to improve their performance. AdaBoost is adaptive in the sense that a next successive classifier is modified in light of those instances misclassified by previous classifiers. The previous classifiers used by AdaBoost can be weak classifiers (e.g., display a substantial error rate), but so long as the performance of the classifier is not random, it improves the overall classifier model.

Figure 5:
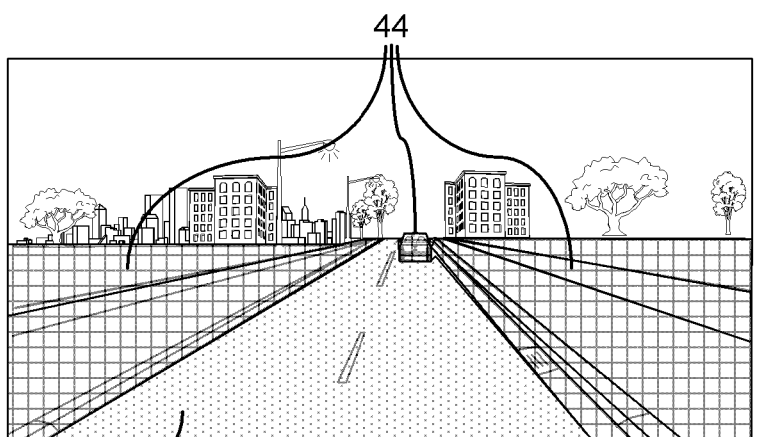
FIG. 5 is an exemplary image identifying the clear path and non-clear path after classification

FIG. 5 illustrates the results of the classification process based on the segmentation of perspective view image captured by the image capture device. As shown in FIG. 5, the clear path is identified by the regions shown generally at 42. The regions that are classified as non-clear path regions are illustrated by the cross-hatch regions and are shown generally at 44. The results of identifying the clear path from the captured image may be used by the processing module to actuate applications that include, but are not limited to autonomous driving control methods as known in the art and not described herein, or the processing module may simply provide information to a separate autonomous driving system or other application that may utilize the clear path for pedestrian or object detection. Actions to perceived objects can vary, and include but are not limited to steering changes, throttle changes, braking responses, and warning and relinquishing control of the vehicle to the operator.

A concern with segmenting and classifying the image based on the perspective view is that while confidence may be high with respect to the clear path at a close range to the vehicle, confidence decreases for the segmented portions of the clear path at further distances. That is, for the perspective view, the segments take on different shapes and sizes and become blended with one another for features above ground in the distance. The further the distance from the vehicle, more the objects and the road of travel blend into one another. As a result, distinction between the different segments become difficult, and therefore, the confidence as to whether the clear path was properly segmented and classified at greater distances decreases.

Figure 6:
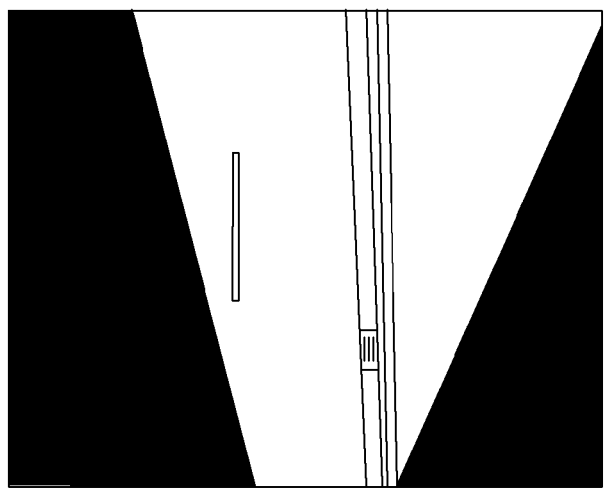
FIG. 6 is an exemplary top-down view of the capture input image.

To gain added confidence to the classification for a same segmented patch, a top-down view approach is used for detecting the clear path from the image. Unlike the perspective view, the top-down view approach aims to utilize only ground plane features. All features in the image are assumed to be on the ground plane. However, if an object is mapped in the top down view and is not in characteristic with the surrounding ground plane, then an assumption can be made that the object is not part of the ground plane and such features can be removed for further clear path analysis, Two embodiments may be utilized for determining the clear path from a top-down view. The first embodiment includes generating a top-down view directly from the perspective view of the captured input image. FIG. 6 illustrates a top-down view generated from the perspective view shown in FIG. 2. The top-down view is generated by mapping pixels from the perspective view to the top-down view.

Mapping is a one-to-one relationship between a perspective view and an associated top-down view. In generating the top-down view, the goal is to utilize only features from the ground plane. Mapping utilizes a pinhole camera model and an on-ground assumption. If the top view range on the ground is $(x_1 \rightarrow x_2, y_1 \rightarrow y_2, 0 \rightarrow 0)$ and a M×N grid is used to cover the top-down view range, then each grid point location (u,v) can be calculated in the image plane using a pinhole camera model. The pixel values for each grid point are then determined using interpolation of neighboring pixels to generate the top-down image.

Figure 7:
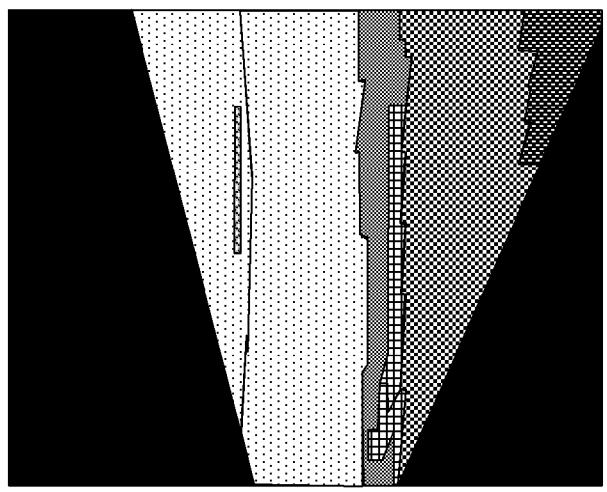
FIG. 7 is an exemplary segmented top-down view of the capture input image.

Segmentation is then applied to the top down image of FIG. 6 utilizing the segmentation techniques described above. FIG. 7 illustrates a segmented top-down view generated from the top-down image of FIG. 6.

Figure 8:
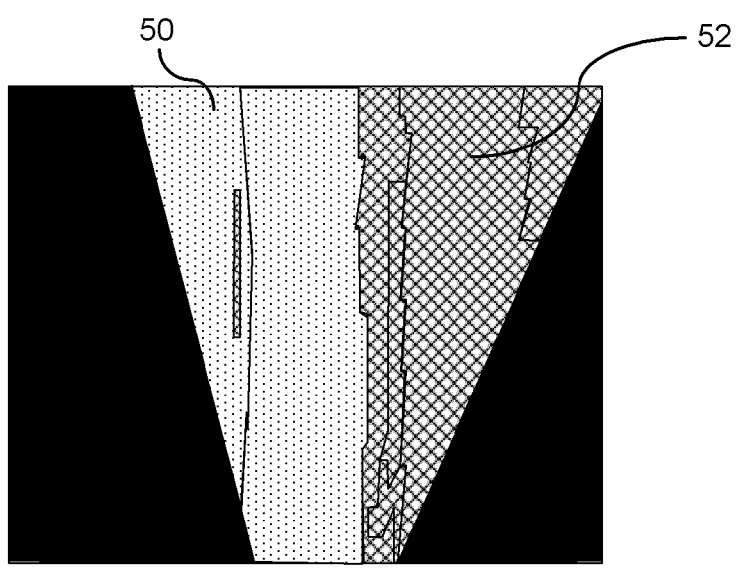
FIG. 8 is an exemplary top-down view identifying the clear path and non-clear path after classification.

Classification is applied to each segmented region of FIG. 7. FIG. 8 illustrates the results of the classification process based on the segmented top-down view of FIG. 7. As shown in FIG. 8, the clear path is identified by the regions shown generally at 50. The regions that are classified as non-clear path regions are shown generally at 52. The results of identifying the clear path from the captured image may be cooperatively used in combination with the results classification from the perspective view to gain added confidence as to what is the clear path region of the image.

The advantage of performing classification on the segmented top-down view is that only ground plane features tend to run in parallel to one another, and therefore, road edges and other road identifiers can be more readily identified. For example, in FIG. 7, the segmented regions have border lines that are typically represented by somewhat parallel lines or substantially straight lines that extend in a substantially same direction. In contrast, the segmented perspective view shown in FIG. 3 includes segments of different shapes, sizes, and has border lines that extend in various directions, which increases the number of segments that must analyzed, increases the data for processing, and makes detection of the clear path more difficult. The top-down view provides more uniform segments each typically extending in the same direction, and therefore the road edges may be more readily identified when classification is performed.

The second embodiment includes generating a segmented top-down view directly from the segmented perspective view. As opposed to generating a top-down view directly by mapping from the captured input image (FIG. 2), the segmented top-down view (FIG. 7) is generated based on the segmented captured input image (FIG. 3). The segmented top-down view (FIG. 7) is generated directly by mapping pixels from the segmented perspective view (FIG. 3) to a segmented top-down view. FIG. 7 illustrates the segmented top-down view of the captured image directly obtained by mapping the segmented captured image. Since the perspective view of the capture image is already segmented, segmentation is not required to generate the segmented top-down image. Rather, a transfer of segmented data is performed by mapping the data from the segmented perspective view image to the top-down image. That is, the segmentation techniques as described above do not need to be re-applied when generating the top-down view; rather, only mapping is applied to generate the segmented top-down image. A selective group of already established segmented regions are transferred and displayed in the top-down view. If a pixel is identified as part of respective segment in the perspective view, then the pixel maintains the same segment status when the pixel is mapped into the top-down view.

After the segmented view is generated, the regions of the segmented top-down view are input to the classifier for classifying each of the regions as either clear path or non-clear as shown in FIG. 8.

While certain embodiments of the present invention have been described in detail, those familiar with the art to which this invention relates will recognize various alternative designs and embodiments for practicing the invention as defined by the following claims.

What is claimed is:

1. A method of detecting a clear path of travel for a vehicle utilizing a top-down view technique, the method comprising the steps of:
   capturing an input image of a scene exterior of the vehicle, the captured input image representing a perspective view of the road of travel;
   analyzing the captured input image;
   generating a segmented top-down image that includes potential clear path regions and potential non-clear path regions, the segmented top-down image representing a viewing angle perpendicular to a ground plane;
   inputting the segmented regions of the segmented top-down view to a classifier for identifying the clear path regions of travel; and
   utilizing the identified clear path regions for navigating the road of travel.

2. The method of claim 1 wherein the step of analyzing the captured input image further comprises the step of segmenting the captured input image, wherein segmenting the captured input image subdivides the captured input image according to discernable boundaries, wherein the segmented top-down image is generated from the segmented input image.

3. The method of claim 2 wherein the step of segmenting the captured input image includes performing motion analysis to captured input image, wherein the discernable boundaries are identified based on regions of the captured input image being associated with motion relative to a ground plane, wherein the regions associated with motion relative to the ground plane are identified as potential non-clear path regions.

4. The method of claim 2 wherein the step of segmenting the captured input image includes performing texture analysis to captured input image, wherein the discernable boundaries are identified based on regions of the captured input image being having texture, wherein the regions having texture are identified as potential non-clear path regions.

5. The method of claim 2 wherein the step of segmenting the captured input image includes performing color analysis to captured input image, wherein the discernable boundaries are identified based on regions of the captured input image having respective colors, wherein a respective region is identified as a potential clear path region or a potential non-clear path region based on an identified color of the respective region.

6. The method of claim 2 wherein the step of segmenting the captured input image includes performing geometric shape analysis, wherein the discernable boundaries are identified based on regions of the captured input image having respective geometric shapes, wherein a respective region is identified as a potential clear path region or a potential non-clear path region based on an identified geometric shape of the respective region.

7. The method of claim 2 wherein the step of segmenting the captured input image includes performing one of at least motion analysis, texture analysis, color analysis, and geometric shape analysis for subdividing the capture input image according to discernable boundaries, wherein results of identifying the discernable boundaries are input to a fusion module for generating a fused set of discernable boundaries.

8. The method of claim 7 wherein features are extracted from the segmented regions defined by the fused set of discernable boundaries, and wherein the extracted features are input to the classifier for identifying clear path regions.

9. The method of claim 2 wherein the segmented top-down image is generated based on a mapping of the pixels from the segmented input image to the segmented top-down image.

10. The method of claim 2 wherein the mapping of the pixels from the segmented input image to the segmented top-down image is generated in real-time.

11. The method of claim 1 wherein the step of analyzing the captured input image further comprises the step of generating a top-down image from the captured input image, wherein a segmented top-down image is generated from the top-down image, wherein segmenting the captured input image subdivides the captured input image according to discernable boundaries of features in the image, wherein segmenting the captured input image subdivides the capture input image according to discernable boundaries, and wherein the top-down image is a view perpendicular to a ground plane.

12. The method of claim 11 wherein the top-down image is generated based on a viewing angle perpendicular to a ground plane.

13. The method of claim 11 wherein the top-down image is generated based on a mapping of the pixels from the captured input image to the top-down image.

14. The method of claim 13 wherein the mapping of the pixels from the captured input image to the top-down image is generated in real-time.

15. The method of claim 13 wherein the mapping of the pixels from the captured input image to the top-down image is based on a pinhole camera model.

16. The method of claim 13 wherein the mapping of the pixels from the captured input image to the top-down image is based on an assumption that all pixels on are a ground plane.

17. The method of claim 1 wherein features are extracted from the segmented regions of the segmented top-down view image, and wherein the extracted features are input to the classifier for determining the clear path regions and non-clear path regions.

18. The method of claim 17 wherein a support vector machine classifies extracted features in the segmented regions of the segmented top-down view as clear path or non-clear path.

19. The method of claim 17 wherein an AdaBoost classifier classifies extracted features in the segmented regions of the segmented top-down view as clear path or non-clear path.

* * * * *